(12) United States Patent
Kokubo et al.

(10) Patent No.: US 9,884,955 B2
(45) Date of Patent: Feb. 6, 2018

(54) HYDROXYLATED-FULLERENE-CONTAINING SOLUTION, RESIN MOLDING AND RESIN COMPOSITION EACH USING THE SAME, AND METHOD FOR PRODUCING EACH OF THE RESIN MOLDING AND THE RESIN COMPOSITION

(71) Applicant: TOTAI Co., Ltd., Tokyo (JP)

(72) Inventors: Ken Kokubo, Suita (JP); Takeshi Noguchi, Yufu (JP); Juichi Kasai, Tokyo (JP); Akio Harada, Kyoto (JP)

(73) Assignee: TOTAI CO., LTD., Tokyo (JP)

( * ) Notice: Subject to any disclaimer, the term of this patent is extended or adjusted under 35 U.S.C. 154(b) by 225 days.

(21) Appl. No.: 14/692,951

(22) Filed: Apr. 22, 2015

(65) Prior Publication Data

US 2016/0312011 A1  Oct. 27, 2016

(51) Int. Cl.
| | |
|---|---|
| *B05D 3/02* | (2006.01) |
| *C01B 31/00* | (2006.01) |
| *C08J 3/205* | (2006.01) |
| *C08K 3/04* | (2006.01) |
| *C09D 7/14* | (2006.01) |
| *C08K 9/04* | (2006.01) |
| *C09D 7/00* | (2006.01) |
| *C09D 7/12* | (2006.01) |
| *C08J 7/06* | (2006.01) |
| *C08J 7/12* | (2006.01) |
| *C08J 3/20* | (2006.01) |
| *C01B 32/152* | (2017.01) |

(52) U.S. Cl.
CPC ............ *C08K 9/04* (2013.01); *C08J 3/20* (2013.01); *C08J 7/06* (2013.01); *C08J 7/12* (2013.01); *C09D 7/001* (2013.01); *C09D 7/1225* (2013.01); *B05D 3/0254* (2013.01); *C01B 32/152* (2017.08); *C08J 3/2053* (2013.01); *C08J 2323/12* (2013.01); *C08J 2323/26* (2013.01); *C08J 2329/04* (2013.01); *C08K 3/041* (2017.05); *C08K 2003/045* (2013.01)

(58) Field of Classification Search
CPC ............ C08K 2003/045; C01B 32/152–32/156
See application file for complete search history.

(56) References Cited

U.S. PATENT DOCUMENTS

| | | | | |
|---|---|---|---|---|
| 2010/0237296 | A1* | 9/2010 | Gilje ...................... | B82Y 30/00 252/510 |
| 2012/0041146 | A1* | 2/2012 | Zhang ...................... | C08H 6/00 525/135 |

FOREIGN PATENT DOCUMENTS

| | | |
|---|---|---|
| JP | 2004-075933 A | 3/2004 |
| JP | 2005-097329 A | 4/2005 |
| JP | 2014-077109 A | 5/2014 |

* cited by examiner

*Primary Examiner* — Ramsey Zacharia

(74) *Attorney, Agent, or Firm* — Westerman, Hattori, Daniels & Adrian, LLP

(57) ABSTRACT

A hydroxylated-fullerene-containing solution in which a hydroxylated fullerene is evenly nano-dispersed in a solvent removable at low temperature in a subsequent step is provided. The hydroxylated-fullerene-containing solution includes a continuous phase including a mixed solvent consisting essentially of tetrahydrofuran and water or including melted phenol, and at least one of a hydroxylated fullerene and a hydroxylated fullerene derivative that is dispersed as a dispersed phase in the continuous phase, wherein the number-standard average particle diameter of particles in the dispersed phase is 50 nm or less. This solution is applied onto a surface of a resin molding, and then tetrahydrofuran and water, as the mixed solvent, are removed to form a hydroxylated fullerene layer on the surface of the resin molding. Alternatively, this solution is mingled with a resin, and then the mixed solvent is removed to produce a hydroxylated-fullerene-containing resin composition.

5 Claims, 5 Drawing Sheets

MEASURED RESULTS OF ULTRAVIOLET TRANSMITTANCE OF EACH
HYDROXYLATED FULLERENE/POLYPROPYLENE LAMINATED FILM

MEASURED RESULTS OF ULTRAVIOLET AND VISIBLE RAY TRANSMITTANCE OF EACH HYDROXYLATED FULLERENE / PVA COMPOSITE FILM

MEASURED RESULTS OF ULTRAVIOLET TRANSMITTANCE OF EACH
HYDROXYLATED FULLERENE / POLYPROPYLENE COMPOSITE FILM

HYDROXYLATED-FULLERENE-CONTAINING SOLUTION, RESIN MOLDING AND RESIN COMPOSITION EACH USING THE SAME, AND METHOD FOR PRODUCING EACH OF THE RESIN MOLDING AND THE RESIN COMPOSITION

BACKGROUND OF THE INVENTION

Field of the Invention

The present invention relates to a hydroxylated-fullerene-containing solution containing at least one of a hydroxylated fullerene and a hydroxylated fullerene derivative (hereinafter, at least one of a hydroxylated fullerene and a hydroxylated fullerene derivative is referred to as a "hydroxylated fullerene"). The invention also relates to a resin molding and a resin composition in each using the hydroxylated-fullerene-containing solution, and a method for producing each of the resin molding and the resin composition.

Description of the Related Art

In recent years, many researches have been made about nanocomposites each composed of a synthetic resin materials and a nanomaterials such as fullerene, carbon nanotubes, or a graphene. For example, the following have been performed: mixing a fullerene, which is a nanomaterial, with a resin solution; melting, kneading and mixing a fullerene with a resin solution; and adding/mixing a fullerene in polymerization.

In order to exhibit functions of a fullerene, which is a nanomaterial, to a maximum degree, it is necessary to disperse the fullerene evenly to a nano-level size (that is, nano-disperse the fullerene).

However, a hydroxylated fullerene, which is in the form of nanoparticles, has a large surface area and a small distance between the particles. Consequently, the particles aggregate remarkably easily. Thus, it is difficult to produce a stable nano-dispersed system thereof industrially. Furthermore, a solvent in which a hydroxylated fullerene is completely evenly dissolved is limited in number. It is therefore considerably difficult to economically exhibit functions (such as strength, hardness, and ultraviolet absorbing power) of the hydroxylated fullerene, which is expensive in a composite material of the hydroxylated fullerene with a resin.

JP-A-2004-75933 discloses that a resin composition is obtained by melting and kneading polyhydroxylated fullerene or polyhydroxylated fullerene hydrogenfulfate ester and a thermoplastic resin, and a resin composition is obtained by polymerizing polyhydroxylated fullerene or polyhydroxylated fullerene hydrogensulfate ester and a monomer or thermoplastic resin precursor.

JP-A-2005-97329 discloses a high-concentration fullerene derivative composition in which a fullerene derivative is dissolved in a solvent such as a formamide, sulfoxide or sulfon.

In the resin composition disclosed in JP-A-2004-75933, when melting and kneading polyhydroxylated fullerene or polyhydroxylated fullerene hydrogensulfate ester and a thermoplastic resin, or when polymerizing polyhydroxylated fullerene or polyhydroxylated fullerene hydrogensulfate ester and a monomer or thermoplastic resin precursor, a part of polyhydroxylated fullerene or polyhydroxylated fullerene hydrogensulfate ester remains easily as aggregates. In particular, since a fullerene derivative has a very high polarity such as a hydroxylated fullerene having many hydroxyl groups, a part of the hydroxylated fullerene remains as aggregates.

It is therefore impossible to economically exhibit functions (such as strength, hardness, and ultraviolet absorbing power) of the hydroxylated fullerene in the thermoplastic resin composition. When a film or resin molding is produced from such a resin composition, an aggregate is present on the surface of the film or resin molding so that various problems are caused. For example, the aggregate is peeled to cause problems, such as contamination with foreign substances, at the stage of a product of the film or resin molding. Accordingly, there is caused a problem that the film or resin molding is unusable for precise products.

As disclosed in JP-A-2005-97329, when a hydroxylated fullerene is dissolved in a solvent such as a formamide, sulfoxide or sulfone, the hydroxylated fullerene comes not to be dissolved in the solvent when the number of hydroxyl groups of the hydroxylated fullerene is 44 or more. Accordingly, a stable nano-dispersed system cannot be produced to make it impossible to economically exhibit functions (such as strength, hardness, and ultraviolet absorbing power) of the hydroxylated fullerene in thermoplastic resin composites.

Such a solvent has a boiling point of 150° C. or higher. Thus, in order to remove the solvent (liquid medium), it becomes necessary to heat and dry the solution at high temperature, so that the base resin may be unfavorably denatured. In order to avoid this inconvenience, an expensive vacuum apparatus or the like is required for drying the solution at low temperature. As a result, the resultant cannot be continuously processed in the form of a film or some other. There therefore remains a problem that remarkably high facility costs are required and the resultant products are deteriorated in productivity.

SUMMARY OF THE INVENTION

These problems are solved, and it is made possible to economically exhibit functions (such as strength, hardness, and ultraviolet absorbing power) of an expensive hydroxylated fullerene in composites of the hydroxylated fullerene with a resin.

Accordingly, a hydroxylated-fullerene-containing solution in which a hydroxylated fullerene is evenly nano-dispersed in a solvent removable at low temperature in a subsequent step is provided.

A resin molding including a synthetic resin, and a hydroxylated fullerene layer that does not have any aggregate of the hydroxylated fullerene is provided by applying the hydroxylated-fullerene-containing solution onto a surface of this resin molding; and a method for producing a resin molding having such a hydroxylated fullerene layer without degradation of a resin base material of the resin molding is provided.

A resin composition containing a hydroxylated fullerene without containing any aggregate by mingling the above-mentioned hydroxylated-fullerene-containing solution with a resin; and a method for producing such a hydroxylated-fullerene-containing resin composition are provided.

A hydroxylated-fullerene-containing solution includes: a continuous phase comprising (i) a mixed solvent consisting essentially of tetrahydrofuran and water or (ii) melted phenol; and at least one compound selected from the group of a hydroxylated fullerene and a hydroxylated fullerene derivative, dispersed as a dispersed phase in the continuous phase; wherein the number-standard average particle diameter of particles in the dispersed phase is 50 nm or less.

The hydroxylated-fulleren-containing solution comprises (i) the mixed solvent, and contains water preferably in a proportion of 15% by weight or more, more preferably in a proportion of 25% by weight or more.

A method is provided for producing a resin molding having a hydroxylated fullerene layer, in which at least a surface of the resin molding comprises a hydrophilic resin of a polymer having a hydrophilic group at a main chain or a side chain of the polymer, includes: applying the hydroxylated-fullerene-containing solution onto the surface of the resin molding, this solution comprising (i) the mixed solvent; and removing tetrahydrofuran and water. A resin molding produced by this producing method is also provided.

A method is provided for producing a resin molding having a hydroxylated fullerene layer, in which at least a surface of the resin molding comprises a hydrophobic resin of a polymer being free from hydrophilic group at a main chain or side chain of the polymer, including: subjecting the surface of the resin molding to hydrophilizing treatment; applying the fullerene-hydroxide-containing solution onto the hydrophilized surface of the resin molding, this solution comprising (i) the mixed solvent; and removing tetrahydrofuran and water. A resin molding produced by this producing method is also provided.

A method is provided for producing hydroxylated-fullerene-containing resin composition, including: mingling a resin with the hydroxylated-fullerene-containing solution, this solution comprising (i) the mixed solvent; and removing tetrahydrofuran and water. A hydroxylated fullerene-containing resin composition produced by this producing method is also provided.

Tetrahydrofuran and water is preferably removed by a method of converting a liquid phase to a gas phase, such as drying removal or vaporizing removal.

A hydroxylated fullerene is a compound containing one or more hydroxyl groups bonded directly to a fullerene nucleus. The solubility of the hydroxylated fullerene in various solvents is varied in accordance with the number of the hydroxyl group(s) in the hydroxylated fullerene. As has been described about JP-A-2005-97329, the hydroxylated fullerene is not easily dissolved so that an aggregate may be generated.

In contrast, a hydroxylated-fullerene-containing solution is obtained by that a mixed solvent consisting essentially of water and tetrahydrofuran (THF; boiling point: 66° C.), which is an amphiphilic solvent having a lower boiling point than water, is made into a continuous phase, and a hydroxylated fullerene in a dispersed phase is made into the form of fine particles having a number-standard average particle diameter of 50 nm or less. The hydroxylated fullerene-containing solution is a completely even solution, in which no aggregate is present. Alternatively, a hydroxylated-fullerene-containing solution is obtained by that melted phenol is made into a continuous phase, and a hydroxylated fullerene in a dispersed phase is made into the form of fine particles having a number-standard average particle diameter of 50 nm or less. The hydroxylated-fullerene-containing solution is a completely even solution, in which no aggregate is present.

The completely even solution is herein defined as a solution in which no aggregate is generated to exhibit transparency at normal temperature according to visual observation when the concentration of a hydroxylated fullerene is adjusted to 0.5% by weight.

The inventors have made eager investigations to find out that the ratio between water and tetrahydrofuran (THF) for rendering a solution of a hydroxylated fullerene the completely even solution is varied in accordance with the number of hydroxyl groups in the hydroxylated fullerene, and that there is a tendency that as the number of the hydroxyl groups is smaller, the smaller proportion of water is sufficient.

When the number of the hydroxyl groups is 10 or more, the mixed solvent contains water preferably in a proportion of 15% by weight or more, more preferably in a proportion of 25% by weight or more in order to obtain a completely even solution.

A hydroxylated fullerene layer can be produced on a surface of the resin molding by applying the hydroxylated-fullerene-containing solution onto a surface of a resin molding including a synthetic resin, and subsequently removing the mixed solvent consisting essentially of tetrahydrofuran and water. In the production of this hydroxylated fullerene layer, the hydroxylated-fullerene-containing solution, which is a completely even solution containing no aggregate, is used. It is therefore possible to produce the hydroxylated fullerene layer which is even and dense and contains no aggregate on the surface of the resin molding to exhibit functions (such as strength, hardness, ultraviolet absorbing power) of the hydroxylated fullerene in a composite material of the hydroxylated fullerene with the resin to a maximum degree. This matter makes it possible to decrease in use amount of the expensive hydroxylated fullerene and produce a resin molding having a good-quality hydroxylated fullerene layer economically.

Additionally, the mixed solvent consisting essentially of tetrahydrofuran and water has a lower boiling point than water. Thus, the temperature at which the mixed solvent is removed can be made low, not to produce an adverse influence on the resin. Consequently, it is not feared that the synthetic resin is denatured or deteriorated at the time of removing the mixed solvent. Moreover, no special apparatus, such as an expensive vacuum dryer, is required for removing the mixed solvent, so that a resin molding having a hydroxylated fullerene layer can be economically produced.

A smooth, dense, strong and not easily peelable hydroxylated fullerene layer can be produced on a surface of a resin molding including a hydrophilic resin or a hydrophilized hydrophobic resin by dispersing a hydroxylated fullerene in a mixed solvent consisting essentially of tetrahydrofuran and water.

Furthermore, a hydroxylated-fullerene-containing resin composition can be produced by migling the hydroxylated-fullerene-containing solution with a resin, and then removing the mixed solvent. At this time, a hydroxylated-fullerene-containing resin composition can be produced by using a completely even hydroxylated-fullerene-containing solution which contains a hydroxylated fullerene dispersed, in the order of nanometer, to have a number-standard average particle diameter of 50 nm or less but contains no aggregate. The hydroxylated-fullerene-containing resin composition contains no aggregate and is capable of exhibiting properties of the hydroxylated fullerene to a maximum degree in the order of nanometer. For this reason, the use amount of the expensive hydroxylated fullerene can be decreased so that economical advantages are produced. It is sufficient for the temperature at which the mixed solvent is removed to be low. Thus, when the mixed solvent is removed, it is not feared that the resin is denatured or deteriorated. Additionally, no special apparatus, such as an expensive vacuum dryer, is required for removing the mixed solvent, so that the hydroxylated-fullerene-containing resin composition can be economically produced.

Properties of the resin are improved by the hydroxylated fullerene in the order of nanometer comprised in the hydroxylated-fullerene-containing resin composition. Thus, the composition is usable as a resin base for various articles. The composition is usable for the following as a material having a function such as resin modification, surface modification, surface protection, ultraviolet absorption, gas barrier, radical capture, or proton conductivity: films for wrapping, films for foods, ultraviolet preventing films, antifogging films, antifouling films, other films for agriculture/building, antireflective films, light polarizing films, other films for electric/electronic materials, antistatic films, coating agents, three-dimensional molded article, and others.

DETAILED DESCRIPTION OF THE INVENTION

Figure 1:
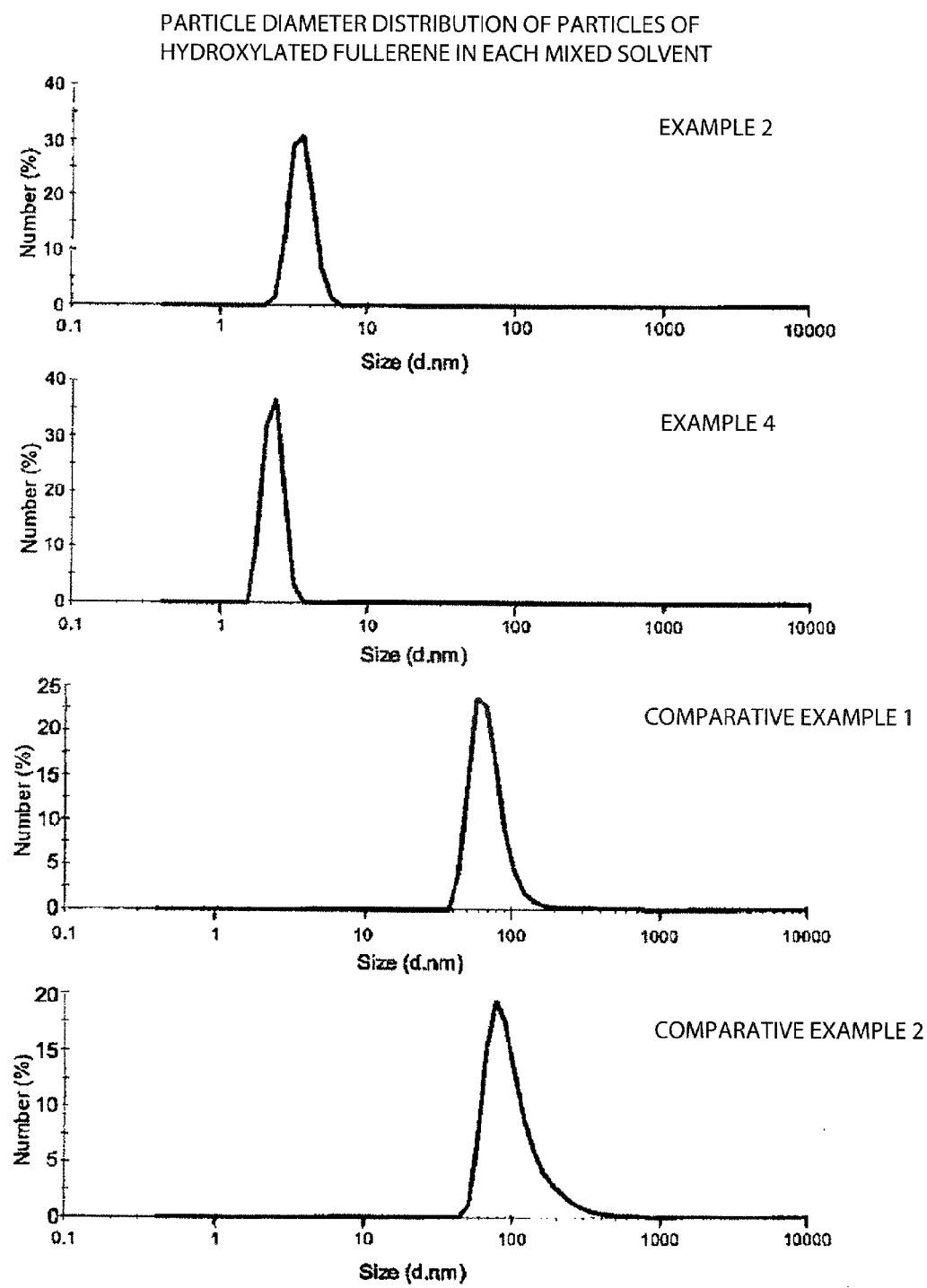
FIG. 1 is a chart including graphs each showing a particle diameter distribution of particles of a hydroxylated fullerene in a mixed solvent.

Hereinafter, the present invention will be described in detail.

A hydroxylated-fullerene-containing solution in which a hydroxylated fullerene is evenly nano-dispersed in a solvent removable at low temperature is provided and functions of the hydroxylated fullerene are exhibited to a maximum degree by applying this hydroxylated-fullerene-containing solution onto a surface of a resin molding, or mingling the solution with a resin.

A hydroxylated fullerene is a compound in which a hydroxyl group is directly bonded to a fullerene nucleus. A hydroxylated fullerene derivative includes, in the category thereof, any compound in which a halogen group, besides a hydroxyl group, is bonded to a fullerene nucleus, and any compound in which a hydroxyl group of a fullerene nucleus is sequestered with, for example, an ester bond (at least one of a hydroxylated fullerene and a hydroxylated fullerene derivative is referred to as a "hydroxylated fullerene" in the invention). The hydroxylated fullerene may include, in the category thereof, a $C_{60}$ fullerene nucleus, and a higher-order fullerene nucleus of $C_{70}$ or more.

The following is defined as a completely even solution: a solution in which no aggregate (precipitation) is generated to exhibit transparency at normal temperature according to visual observation when the concentration of a hydroxylated fullerene is adjusted to 0.5% by weight.

The inventors have made eager investigations to find out that a completely even solution, in which no aggregate (precipitation) is generated, is obtained by dispersing a hydroxylated fullerene in the order of nanometer (number-standard average particle diameter is 50 nm or less, preferably 10 nm or less) in a solvent which is a continuous phase. The number-standard average particle diameter is calculated by using, as a standard, a light intensity distribution of the solution measured by a dynamic light scattering method.

The inventors have also found out that the dispersibility of a hydroxylated fullerene, in the order of nanometer, in a solvent depends on the number of hydroxyl groups of the hydroxylated fullerene and the composition of the solvent. Specifically, the inventors found out that: various hydroxylated fullerene are dispersed in the order of nanometer in the solvent by use of a mixture of water and tetrahydrofuran (THF) as a solvent; the ratio between water and tetrahydrofuran is varied in accordance with the number of hydroxyl groups of the hydroxylated fullerene; and when the number of the hydroxyl groups is smaller, there is a tendency that a smaller proportion of water is sufficient.

In this way, the inventors have found out that an optimal composition of the mixed solvent is present which is matched with the degree of hydrophobicity of the particular hydroxylated fullerene. Specifically, the inventors have found out that even though the mixed solvent is larger in hydrophobicity degree (or smaller in hydrophilicity degree), or even though the mixed solvent is smaller in hydrophobicity degree (or larger in hydrophilicity degree) than the degree of hydrophobicity of the particular hydroxylated fullerene, the following diameter largely exceeds 50 nm (nanometers): the diameter, specifically, the number average particle diameter of fine particles of the hydroxylated fullerene which constitute a dispersed phase of the fullerene-containing solution, this particle diameter being obtained by a dynamic light scattering method. When the degree of hydrophobicity of the hydroxylated fullerene is matched with that of the water-mixed solvent, the diameter, specifically the number average particle diameter of the particles in the dispersed phase of the hydroxylated-fullerene-containing solution, becomes 50 nm or less.

The hydroxylated fullerene becomes larger in hydrophobicity degree as the number of the hydroxyl groups bonded to the fullerene nucleus is smaller when the number of hydroxyl groups bonded to a $C_{60}$ fullerene nucleus is 44 or less. Specifically, a hydroxylated fullerene having 30 or more hydroxyl groups is water-soluble (hydrophilic), while a hydroxylated-fullerene having about 10 hydroxyl groups is water-insoluble (hydrophobic), or is not dissolved in neutral water. A hydroxylated fullerene derivative includes, in the category thereof, any compound in which a halogen group is bonded to a fullerene nucleus, and any compound in which a hydroxyl group of a fullerene nucleus is sequestered with, for example, an ester bond. However, the hydrophobicity degree of the derivative is varied in accordance with a substituent added to the fullerene nucleus.

Tetrahydrofuran (THF), which constitutes the mixed solvent, has a lower boiling point (66° C.) than water, and is an amphiphilic solvent affinitive with hydrophilic and hydrophobic substances. The mixed solvent may be a solvent in which a different solvent having a boiling point of 100° C. or lower is mixed with tetrahydrofuran and water to adjust the amphiphilicity of the solvent. Examples of the different solvent in the mixed solvent include methanol, ethanol, 1- and 2-propanols, acetone, acetonitrile, diethyl ether, 1,4-dioxane, ethyl acetate, N,N-dimethylformamide, dimethylsulfoxide, and N-methylpyrrolidone. Of these examples, preferred are methanol, ethanol, 1- and 2-propanols, acetone, acetonitrile, diethyl ether, 1,4-dioxane, and ethyl acetate. The content by percentage of the different solvent in the mixed solvent is preferably less than 5% by weight, more preferably less than 3% by weight. It is believed that even when a different solvent is blended in a small proportion in the mixed solvent, the blend does not affect the characteristics of the invention.

Experimental results have demonstrated that when the number of the hydroxyl groups is 10 or more, the mixed solvent contains water preferably in a proportion of 15% by weight or more, more preferably in a proportion of 25% by weight or more in the mixed solvent to gain a completely even solution in which no aggregate is generated.

Specifically, the following results have been obtained.

When the ratio by weight of tetrahydrofuran to water in a mixed solvent of THF and $H_2O$ was from 3:1 to 1:1 in a solution in which a hydroxylated fullerene having 10 to 14 hydroxyl groups ($C_{60}(OH)_n$ wherein n=10 to 14) was dissolved, the solution was a brown, transparent, and completely even solution, in which no aggregate was generated. The average particle diameter of particles in this even solution was 10 nm or less. Furthermore, when THF was added thereto in a larger proportion, an aggregate was generated in a portion of the resultant system, but the average particle diameter of particles in a solution portion (supernatant) of the system was 50 nm or less to be in the order of nanometer.

The respective proportions of water in (mixed) solvents each consisting essentially of tetrahydrofuran and water were adjusted to 0%, 10%, 15%, 20%, 25%, 50%, 75%, 90% and 100%. $C_{60}(OH)_{10}$ was dissolved in a concentration of 0.5% by weight in each of the solutions. When the proportion of water was each of 15%, 20%, 25% and 50%, a completely even solution, which contains no aggregate, was produced; however, when the proportion of water was each of 0%, 10%, 75%, 90% and 100%, an aggregate was observed with the naked eye.

When the ratio by weight of THF to HO in a mixed solvent of THE and $H_2O$ was from 1:3 to 0:1 in a solution in which a fullerene hydroxide having 36 to 44 hydroxyl groups ($C_{60}(OH)n$ wherein n=36 to 44) was dissolved, the solution was a brown, transparent, and completely even solution, in which no aggregate was generated. The average particle diameter of particles of the hydroxylated fullerene in this solution was 10 nm or less.

As described above, the blend ratio between THF and water is varied in accordance with the number of hydroxyl groups in a hydroxylated fullerene. When the number of the hydroxyl group is about 10, a hydroxylated-fullerene-containing solution in which the fullerene hydroxide is completely evenly dispersed in the order of nanometer can be obtained by increasing the proportion of THF. When the number of the hydroxyl groups is about 40, the same solution can be obtained by increasing the proportion of water. The dispersibility of any hydroxylated fullerene in the order of nanometer in a solution depends on the number of hydroxyl groups and the composition of a mixed solvent of the solution. Accordingly, it is advisable to select the number of the hydroxyl groups and the composition of the mixed solvent appropriately in accordance with the usage of a hydroxylated-fullerene-containing solution.

EXAMPLES

Hereinafter, properties of the hydroxylated-fullerene-containing solution including a mixed solvent will be described with specific working examples thereof.

Hydroxylated-Fullerene-Containing Solution

Example 1

A hydroxylated fullerene $C_{60}(OH)_{10}$ (manufactured by Frontier Carbon Corp.) was added in an amount of 0.1 g to 20 g of a mixed solvent of THF and neutral water having a pH of 6 to 7 (hereinafter abbreviated merely to "water"), the ratio by weight of THF to water being 75:25. The hydroxylated fullerene solution was allowed to stand still at the concentration of 0.5% by weight at room temperature for 1 day. Thereafter, the solubility of the solution was examined. Herein, completely even solubility is defined as the dissolution property of a solution which is transparency and has no aggregate according to visual observation when the concentration of a fullerene is 0.5% by weight.

The diameter of particles of the fullerene was measured by measuring a solution having completely even solubility at the concentration of 0.1% by weight by a dynamic light scattering method using a zeta-potential/particle-diameter/molecular-weight measuring instrument (trade name: ZETASIZER NANO) manufactured by Sysmex Corp, and the number-standard average particle diameter thereof was calculated.

This solution was light brown and transparent, and exhibited completely even solubility such that no aggregate was observed. The number-standard average particle diameter was 2.6 nm (see Table 1).

TABLE 1

Solubility of hydroxylated fullerene in mixed solution, and average particle diameter of particles therein

| | Fullerene derivative | Mixed solution (ratio) THF | Water | State | Solubility Aggregate (precipitation) | Completely even solubility | Number-standard average particle diameter (d · nm) |
|---|---|---|---|---|---|---|---|
| Example 1 | $C_{60}(OH)_{10}$ | 75 | 25 | Light brown and transparent | Not generated | ○ | 2.6 |
| Example 2 | $C_{60}(OH)_{10}$ | 50 | 50 | Light brown and transparent | Not generated | ○ | 3.6 |
| Example 3 | $C_{60}(OH)_{44}$ | 25 | 75 | Light yellow and transparent | Not generated | ○ | 2.3 |
| Example 4 | $C_{60}(OH)_{44}$ | 10 | 90 | Light yellow and transparent | Not generated | ○ | 2.3 |
| Example 5 | $C_{60}(OH)_{36}$ | 10 | 90 | Light brown and transparent | Not generated | ○ | 1.7 |
| Example 6 | $C_{60}(OH)_{10}$ | Melted phenol | | Light brown and transparent | Not generated | ○ | — |
| Comparative | $C_{60}(OH)_{10}$ | 90 | 10 | Light brown and | Generated | X | 77.4 |

TABLE 1-continued

Solubility of hydroxylated fullerene in mixed solution, and average particle diameter of particles therein

| | Fullerene derivative | Mixed solution (ratio) THF | Water | Solubility State | Aggregate (precipitation) | Completely even solubility | Number-standard average particle diameter (d · nm) |
|---|---|---|---|---|---|---|---|
| Example 1 | | | | opaque | | | |
| Comparative Example 2 | $C_{60}(OH)_{10}$ | 25 | 75 | Light brown and opaque | Generated | X | 108.4 |
| Comparative Example 3 | $C_{60}(OH)_{10}$ | 10 | 90 | Light brown and opaque | Generated | X | 194.4 |
| Comparative Example 4 | $C_{60}(OH)_{44}$ | 100 | 0 | opaque | Generated | X | >500 |
| Comparative Example 5 | $C_{60}(OH)_{44}$ | 50 | 50 | Slightly yellow and transparent | Generated | X | >500 |

Example 2

A hydroxylated fullerene $C_{60}(OH)_{10}$ (manufactured by Frontier Carbon Corp.) was added in an amount of 0.1 g to 20 g of a mixed solvent of THF and water, the ratio by weight of THF to water being 50:50. The hydroxylated fullerene solution was allowed to stand still at the concentration of 0.5% by weight at room temperature for 1 day. Thereafter, the solubility of the hydroxylated fullerene and the number-standard average particle diameter of particles therein were examined in the same way as in Example 1. This solution was light brown and transparent, and exhibited completely even solubility such that no aggregate was observed. The number-standard average particle diameter was 3.6 nm (see Table 1 and FIG. 1).

Example 3

A hydroxylatd fullerene $C_{60}(OH)_{44}$ (synthesized in Osaka University according to an article of Nano Research 2011, 4, 204-215 (Non-Patent Literature)) was added in an amount of 0.1 g to 20 g of a mixed solvent of THF and water, the ratio by weight of THF to water being 25:75. The hydroxylated fullerene solution was allowed to stand still at the concentration of 0.5% by weight at room temperature for 1 day. Thereafter, the solubility of the hydroxylated fullerene and the number-standard average particle diameter of particles therein were examined in the same way as in Example 1. This solution was light yellow and transparent, and exhibited completely even solubility such that no aggregate was observed. The number-standard average particle diameter was 2.3 nm (see Table 1).

Example 4

A hydroxylated fullerene $C_{60}(OH)_{44}$ (synthesized in Osaka University) was added in an amount of 0.1 g to 20 g of a mixed solvent of THF and water, the ratio by weight of THF to water being 10:90. The hydroxylated fullerene solution was allowed to stand still at the concentration of 0.5% by weight at room temperature for 1 day. Thereafter, the solubility of the hydroxylated fullerene and the number-standard average particle diameter of particles therein were examined in the same way as in Example 1. This solution was light yellow and transparent, and exhibited completely even solubility such that no aggregate was observed. The number-standard average particle diameter was 2.3 nm (see Table 1 and FIG. 1).

Example 5

A hydroxylated fullerene $C_F(OH)_{36}$ (synthesized in Osaka University according to an article of ACS Nano, 2008, 2, 327-333 (Non-Patent Literature)) was added in an amount of 0.1 g to 20 g of a mixed solvent of THF and water, the ratio by weight of THF to water being 10:90. The hydroxylated fullerene solution was allowed to stand still at the concentration of 0.5% by weight at room temperature for 1 day. Thereafter, the solubility of the hydroxylated fullerene and the number-standard average particle diameter of particles therein were examined in the same way as in Example 1. This solution was light brown and transparent, and exhibited completely even solubility such that no aggregate was observed. The number-standard average particle diameter was 1.7 nm (see Table 1).

Comparative Example 1

A hydroxylated fullerene $C_{60}(OH)_{10}$ (manufactured by Frontier Carbon Corp.) was added in an amount of 0.1 g to 20 g of a mixed solvent of THF and water, the ratio by weight of THF to water being 90:10. The hydroxylated fullerene solution was allowed to stand still at the concentration of 0.5% by weight at room temperature for 1 day. Thereafter, the solubility of the hydroxylated fullerene and the number-standard average particle diameter of particles therein were examined in the same way as in Example 1. This solution was light brown and opaque, and contained a generated aggregate not to exhibit completely even solubility. The number-standard average particle diameter was 77.4 nm (see Table 1 and FIG. 1).

Comparative Example 2

A hydroxylated fullerene $C_6(OH)_1$, (manufactured by Frontier Carbon Corp.) was added in an amount of 0.1 g to 20 g of a mixed solvent of THF and water, the ratio by weight of THF to water being 25:75. The hydroxylated fullerene solution was allowed to stand still at the concentration of 0.5% by weight at room temperature for 1 day. Thereafter, the solubility of the hydroxylated fullerene and the number-standard average particle diameter of particles therein were examined in the same way as in Example 1. This solution was light brown and opaque, and contained a generated aggregate not to exhibit completely even solubility. The number-standard average particle diameter was 108.4 nm (see Table 1 and FIG. 1).

Comparative Example 3

A hydroxylated fullerene $C_{60}(OH)_{10}$ (manufactured by Frontier Carbon Corp.) was added in an amount of 0.1 g to 20 g of a mixed solvent of THF and water, the ratio by weight of THF to water being 10:90. The hydroxylated fullerene solution was allowed to stand still at the concentration of 0.5% by weight at room temperature for 1 day. Thereafter, the solubility of the hydroxylated fullerene and the number-standard average particle diameter of particles therein were examined in the same way as in Example 1. This solution was light brown and opaque, and contained a generated aggregate not to exhibit completely even solubility. The number-standard average particle diameter was 194.4 nm (see Table 1).

Comparative Example 4

A hydroxylated fullerene $C_{60}(OH)_{44}$ (synthesized in Osaka University) was added in an amount of 0.1 g to 20 g of a solvent in which the ratio by weight of THE to water was 100:0. The hydroxylated fullerene solution was allowed to stand still at the concentration of 0.5% by weight at room temperature for 1 day. Thereafter, the solubility of the hydroxylated fullerene and the number-standard average particle diameter of particles therein were examined in the same way as in Example 1. This solution was opaque, and contained a generated aggregate not to exhibit completely even solubility. The number-standard average particle diameter was 500 nm or more (see Table 1).

Comparative Example 5

A hydroxylated fullerene $C_{60}(OH)_{44}$ (synthesized in Osaka University) was added in an amount of 0.1 g to 20 g of a mixed solvent of THF and water, the ratio by weight of THF to water being 50:50. The hydroxylated fullerene solution was allowed to stand still at the concentration of 0.5% by weight at room temperature for 1 day. Thereafter, the solubility of the hydroxylated fullerene and the number-standard average particle diameter of particles therein were examined in the same way as in Example 1. This solution was light yellow and opaque, and contained a generated aggregate not to exhibit completely even solubility. The number-standard average particle diameter was 500 nm or more (see Table 1).

Example 6

1.25 g of phenol (solid) was added to 0.001 g of a hydroxylated fullerene $C_{60}(OH)_{10}$ (manufactured by Frontier Carbon Corp.) to adjust the concentration of the hydroxylated fullerene to 0.08% by weight, and then phenol was melted in a hot water bath of 80° C. to make this system into a liquid form. Ultrasonic waves were applied thereto, and then the state that the hydroxylated fullerene was dissolved was examined. This solution was light brown and transparent, and exhibited completely even solubility such that no aggregate was observed (see Table 1).

Apart from the working examples, the following will describe a hydroxylated fullerene composite in which a hydroxylated fullerene layer contains no aggregate of any hydroxylated fullerene and is formed on a surface of a resin molding made of a hydrophilic or hydrophobic synthetic resin by using a hydroxylated-fullerene-containing solution of the present invention.

When at least the surface of the resin molding comprises a hydrophilic resin (i.e., a polymer having hydrophilic groups such as hydroxyl groups on a main chain or side chains thereof), the hydroxylated fullerene layer is formed on the surface of the resin molding by applying the hydroxylated-fullerene-containing solution onto the surface of the resin molding, and then removing tetrahydrofuran and water, which constitute a mixed solvent of the hydroxylated-fullerene-containing solution.

When at least the surface of the resin molding comprises a hydrophobic resin (i.e., a polymer is free from hydrophilic groups on a main chain or side chains thereof), the surface is subjected to hydrophilizing treatment, using, for example, corona discharge or plasma radiation to produce polar groups such as hydroxyl groups or carbonyl groups beforehand on the surface of the resin. Thereafter, the hydroxylated fullerene layer is formed on the surface of the resin molding by applying the hydroxylated-fullerene-containing solution onto the surface of the hydrophilized resin molding, and then removing tetrahydrofuran and water, which constitute a mixed solvent of the hydroxylated-fullerene-containing solution.

The method for the applying is optionally selectable from spin coating, casting, spraying, dip coating, roll coating and vapor deposition methods, and other methods.

Examples of the hydrophilic resin include polyvinyl alcohol, polysodiumacrylate, polyacrylamide, polyethylene imine, polyethylene imide, polyvinyl pyrrolidone, carboxymethylcellulose, hydroxyethylcellulose, and starches.

Examples of the hydrophobic resin include polyolefin resins such as polyethylene, polyethylene copolymer, polypropylene, polypropylene copolymer, polybutene, polyethylene-butene copolymer, polybutadiene, polyisoprene and polymethylpentene resins; polyester resins such as polyethylene terephthalate, polytrimethylene terephthalate, polybutylene terephthalate and polyethylene naphthalate; polystyrene, rubber-modified polystyrene, acrylonitrile-butadiene-styrene (ABS), acrylonitrile-styrene (AS), polymethyl methacrylate, acrylic, polyvinyl chloride, polyvinylidene chloride, ethylene vinyl alcohol, polyacrylonitrile, polyamide, polyacetal, polyphenylene ether, modified polyphenylene ether, polycarbonate, polysulfone, polyphenylene sulfide, polyetherimide, polyethersulfone, polyarylate, thermoplastic polyimide, polyamideimide, polyketone, fluorine, syndiotactic polystyrene, cyclic polyolefin, phenolic, urea, melamine, unsaturated polyester, epoxy, silicon and polyurethane resins, and any copolymer and mixture made from/of two or more of these resins; and rubbers such as natural, acrylic, nitrile, isoprene, urethane, ethylene/propylene, chlorosulfonated polyethylene, epichlorohydrin, chloroprene, silicone, styrene-butadiene, butadiene, fluorine, and polyisobutylene rubbers.

In one embodiment, a hydroxylated-fullerene-containing solution comprising a mixed solvent consisting essentially of tetrahydrofuran and water as a continuous phase and a hydroxylated fullerene as a dispersed phase is applied onto a hydrophilic resin, and then the resultant is dried to remove the mixed solvent. Thus, a hydroxylated fullerene layer can be produced which is smooth, dense and strong and is not easily peelable. Unclear is a mechanism of the process in which the smooth, dense and strong hydroxylated fullerene coat film is formed. However, this coat film would be formed as follows.

Tetrahydrofuran comprised in the mixed solvent, have a lower boiling point than water, and is an amphiphilic solvent affinitive with hydrophilic and hydrophobic substances. Accordingly, when the mixed solvent consisting essentially of tetrahydrofuran and water vaporizes, an azeotropic mixture of THF and water (the ratio of the former to the latter is 93:7) is formed, and the mixture vaporizes. Thus, tetrahydrofuran having a lower boiling point, vaporizes preferentially. When estimating the water content necessary for THF to flow out completely from a gas-liquid equilibrium of a "THF-water" system so as to be removed so that water remains, the estimated water content is about 7%. Thus, it appears that this solution is composed of water and a fullerene when THF has been completely flown out and removed from this solution in a case where the water content is 15% or more in a hydroxylated-fullerene-containing solution.

In contrast, the mixed solvent consisting essentially of tetrahydrofuran (THF) and water, has a function of dissolving a hydroxylated fullerene, and further has a function of dissolving or swelling the hydrophilic resin for a hydrophilic resin.

Consequently, in the step of vaporizing and removing the mixed solvent after applying the hydroxylated-fullerene-containing solution onto the outer surface of the hydrophilic resin, THF having a lower boiling point than water, vaporizes earlier. The rest of the hydroxylated-fullerene-containing solution penetrates into spaces generated by the vaporization of THF. By repeating this step, the entire THF is vaporized to diffuse to the outside. The resultant portions are filled with water and the hydroxylated fullerene. However, water is strongly bonded to the hydrophilic resin so that the hydroxylated fullerene precipitates onto a surface of the hydrophilic resin to form a coat film.

With the vaporization of the rest of water, water aggregates on the interface between the outer surface of the resin and the hydroxylated fullerene coat film so that the hydroxyl groups of the outer surface of the resin are bonded to the hydroxyl groups of the hydroxylated fullerene coat film through water.

Next, through a step in which water vanishes, the hydroxyl groups of the outer surface of the resin are bonded to those of the hydroxylated fullerene coat film through hydrogen bonding. As a result, a smooth, dense and strong hydroxylated fullerene layer (coat film) would be formed on the outer surface of the hydrophilic resin.

Also in the case of the hydrophobic resin, a smooth, dense and strong hydroxylated fullerene layer (coat film) is formed on the outer surface of the resin by applying the hydroxylated-fullerene-containing solution onto the resin and then drying the resultant to remove the mixed solvent. A mechanism of the formation of the coat film is unclear, but would be as follows.

For example, corona discharge or plasma radiation is initially used to subject the outer surface of the hydrophobic resin to hydrophilizing treatment to produce polar groups such as hydroxyl or carbonyl groups beforehand on the outer surface of the resin. Since the mixed solvent consisting essentially of tetrahydrofuran and water, the solvent has a function of dissolving or swelling any hydrophilized hydrophobic resin.

In the step of vaporizing and removing the mixed solvent after applying the hydroxylated-fullerene-containing solution onto the outer surface of the resin, THE having a lower boiling point than water, vaporizes earlier. The rest of the hydroxylated-fullerene-containing solution penetrates into spaces generated by the vaporization of THF. By repeating this step, the entire THF is vaporized to diffuse to the outside. The resultant portions are filled with water and the hydroxylated fullerene. However, water is strongly bonded to the polar groups of the outer surface of the hydrophobic resin so that the hydroxylated fullerene precipitates onto an interface between the water and the hydrophobic resin to form a coat film.

With the vaporization of the rest of water, water aggregates on an interface between the outer surface of the resin and the hydroxylated fullerene coat film so that the polar groups of the outer surface of the resin are bonded to the hydroxyl groups of the hydroxylated fullerene coat film through water.

Next, through a step in which water vanishes, the polar groups of the outer surface of the hydrophobic resin are bonded to those of the hydroxylated fullerene coat film through hydrogen bonding. As a result, a smooth, dense and strong hydroxylated fullerene coat film would be formed on the outer surface of the hydrophobic resin.

An investigation is made herein about a relationship between a hydroxylated fullerene layer and the particle diameter of particles of the hydroxylated fullerene. The number average particle diameter of particles of a hydroxylated fullerene, which is a dispersed phase of a hydroxylated-fullerene-containing solution, is 50 nm or less, and no aggregate is present in the hydroxylated-fullerene-containing solution. Thus, a smooth and dense layer of the hydroxylated fullerene can be formed on the outer surface of a resin. Conversely, when the diameter, specifically, the number average particle diameter of particles in the dispersed phase of the hydroxylated-fullerene-containing solution is more than 50 nm, a coat film of the hydroxylated fullerene layer formed on the outer surface of the resin loses denseness, and the bending durability of the hydroxylated fullerene layer is also lowered.

The hydroxylated fullerene layer (coat film) formed on the outer surface of a resin has many thin lamella pieces generally laminated onto each other in the hydroxylated fullerene layer. The average thickness of the thin lamellar pieces is affected by the size of voids between the laminated particles. Thus, the thickness is determined in accordance with the average diameter of the particles in the dispersed phase of the hydroxylated-fullerene-containing solution. Accordingly, when the thickness of the hydroxylated-fullerene-containing solution applied and the concentration in the dispersed phase are not varied, the layer number of the thin lamella pieces becomes larger as the number average particle diameter of particles in the dispersed phase of the hydroxylated-fullerene-containing solution is made smaller.

Properties of the coat film depends largely on the layer number of the thin lamella pieces; thus, when hydroxylated fullerene coat films having the same thickness are formed, properties of the coat films improve as the layer number of thin lamella pieces therein is larger. In order to decrease the used amount of an expensive hydroxylated fullerene and exhibit the predetermined performance, it is desired that the number average particle diameter of particles in a dispersed phase of the hydroxylated-fullerene-containing solution is small. In order to exhibit properties of the coat film effectively, the diameter, specifically, the number average particle diameter of the particles in the dispersed phase is desirably 50 nm or less, more desirably 20 nm or less.

Furthermore, a resin composition containing a hydroxylated fullerene which has no aggregate can be obtained by mingling the hydroxylated-fullerene-solution with a resin, and then removing tetrahydrofuran and water, which are a mixed solvent in the hydroxylated-fullerene-containing solution. The resin may be any one of the above-mentioned hydrophilic resins and hydrophobic resins.

It is effective to use a mingling method for the production of the hydroxylated-fullerene-containing resin composition, which is a composite composed of the hydroxylated fullerene and the resin.

There are the mingling methods of (a) mixing a hydroxylated-fullerene-containing solution with a resin solution, (b) kneading a hydroxylated-fullerene-containing solution and a resin, and (c) polymerizing a resin monomer and a hydroxylated-fullerene-containing solution by adding a hydroxylated-fullerene-containing solution into the resin monomer during the resin is polymerized. Any one of these methods is usable.

By way of working examples, the following will describe properties of a hydroxylated fullerene resin composite obtained by applying a hydroxylated-fullerene-containing solution of the present invention onto a resin molding (film), or mingling the same solution with a resin, in which polyvinyl alcohol resin and a polypropylene resin are used, respectively, as typical examples of a hydrophilic resin and a hydrophobic resin. The composition and usage of the hydroxylated fullerene resin composite are not, limited by the following description as far as the composite can exhibit the performance with the hydroxylated-fullerene-containing solution.

Properties of Composites Each Obtained by Applying Hydroxylated-Fullerene-Containing Solution Example 7

A hydroxylated fullerene dispersed liquid was produced in which: a continuous phase was made of a mixed solvent consisting essentially of water and THF in which the proportion of the water is 25% by weight; a dispersed phase was made of a hydroxylated fullerene $C_{60}(OH)_{10}$ having hydroxyl groups; and the concentration of the dispersed hydroxilated fullerene was 0.1% by weight. The diameter, specifically, the number average particle diameter of particles in the dispersed phase of this dispersed liquid was measured by a Sysmex Corporation dynamic light scattering method (using a zeta-potential/particle-diameter/molecular-weight measuring instrument manufactured by Sysmex Corp.). As a result, the number average particle diameter was 2.6 nm.

The hydroxylated fullerene dispersed liquid was applied in a thickness of 150 nm onto a surface of a polyvinyl alcohol resin film of 40 μm thickness, and then the dispersed liquid was dried to remove the mixed solvent. In this way, a poval resin film having a surface on which the hydroxylated fullerene was laminated (hereinafter referred to as a fullerene-laminated poval film) was obtained. The oxygen permeability of each of the poval film and the fullerene-laminated poval film was measured in an atmosphere having a humidity of 60%. The results are as follows:

Poval film: 4.45 $cm^3/m^2 \cdot day \cdot atm$
Fullerene-laminated poval film: 0.66 $cm^3/m^2 \cdot day \cdot atm$ While the poval film was increased in oxygen permeability by effect of water vapor, it was judged that the fullerene-laminated poval film succeeded in being prevented from increasing in oxygen permeability by effect of a moisture proofing effect of the hydrophobic hydroxylated fullerene.

Comparative Example 6

A hydroxylated fullerene dispersed liquid was produced in which the concentration of a hydroxylated fullerene in a mixed solvent consisting essentially of water and THF containing 75% by weight of the water was adjusted to the same as in Example 7. The diameter, specifically, the number average particle diameter of particles in the dispersed phase thereof was measured in the same way as in Example 7. As a result, the number average particle diameter was 108.4 nm.

The hydroxylated fullerene dispersed liquid was applied in the same thickness as given in Example 7 onto a surface of a polyvinyl alcohol resin film having the same thickness as used in Example 7, and then the dispersed liquid was dried to remove the mixed solvent. In this way, a fullerene-laminated poval film was obtained.

The oxygen permeability of the fullerene-laminated poval film was measured under the same conditions as in Example 7. As a result, the oxygen permeability was 0.93 $cm^3/m$ day·atm.

When the number average particle diameter of particles in the dispersed phase of the hydroxylated fullerene dispersed liquid was 108.4 nm, the hydroxylated fullerene coat film lost denseness to be deteriorated in properties such as water resistance. It can be considered that this matter resulted in the increase in the oxygen permeability of the fullerene laminated poval film.

Example 8

A hydroxylated fullerene dispersed liquid was produced in which: a continuous phase was made of a mixed solvent of water and THF in which the proportion of the water is 25% by weight; a dispersed phase was made of a hydroxylated fullerene $C_{60}(OH)_{10}$ having 10 hydroxyl groups; and the concentration of the dispersed hydroxylated fullerene was 0.1% by weight. The diameter, specifically, the number average particle diameter of particles in the dispersed phase of this dispersed liquid was measured by the dynamic light scattering method. As a result, the number average particle diameter was 2.6 nm.

Figure 2:
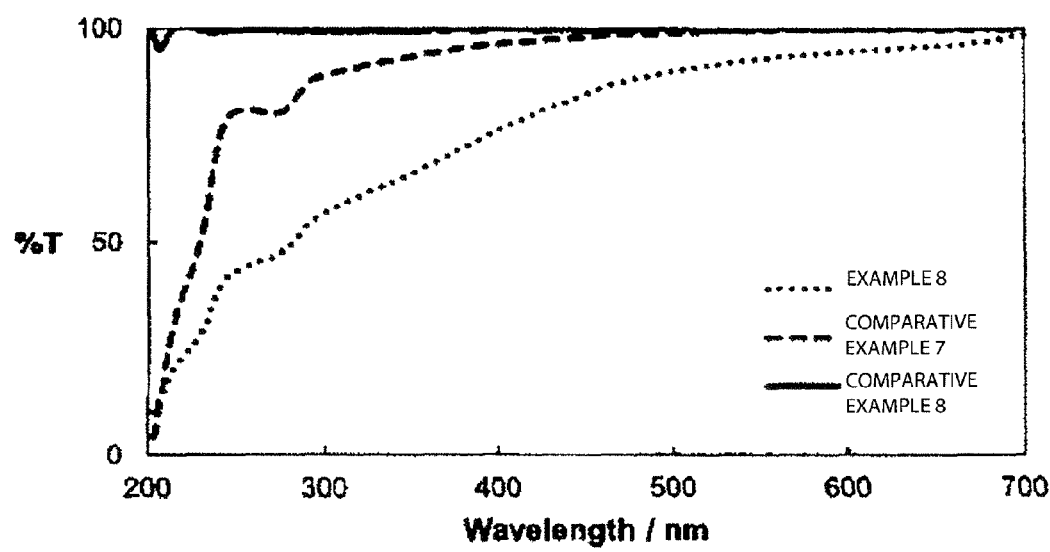
FIG. 2 is a graph showing measured results of the ultraviolet transmittance of each hydroxylated-fullerene/polypropylene laminated film.

The hydroxylated fullerene dispersed liquid was applied in a thickness of 54 nm onto a surface of a polypropylene resin film of 40 μm thickness, polar groups were beforehand generated using corona discharge on the surface of the polypropylene. Thereafter, the dispersed liquid was dried to remove the mixed solvent. In this way, a polypropylene resin film having a surface on which the hydroxylated fullerene was laminated (hereinafter referred to as a fullerene-laminated PP film 1) was obtained. The ultraviolet and visible ray absorbance of the fullerene-laminated PP film 1 was measured at 25° C. and wavelengths of 200 to 700 nm under a condition that a used reference was air, using an ultraviolet spectrophotometer (V-550) manufactured by JASCO Corp. The result is shown in FIG. 2.

Example 8 was compared with Comparative Example 8 described later. As a result, the fullerene-laminated PP film 1 was larger in ultraviolet absorbing effect than a PP film of Comparative Example 8. It can be considered that an ultraviolet preventing effect was exhibited by the dense hydroxylated fullerene coat film.

Comparative Example 7

A hydroxylated fullerene dispersed liquid was produced in which the concentration of a hydroxylated fullerene in a mixed solvent consisting essentially of water and THF containing 75% by weight of the water was adjusted to the same as in Example 7. The diameter, specifically, the number average particle diameter of particles in the dispersed phase therein was measured in the same way as in Example 7. As a result, the number average particle diameter was 108.4 nm.

The hydroxylated fullerene dispersed liquid was applied in the same thickness as given in Example 8 onto a surface of a polypropylene resin film having the same thickness as used in Example 8, the surface being treated in the same way as in Example 8. The dispersed liquid was then dried to remove the mixed solvent. In this way, a fullerene laminated PP film 2 was applied.

The ultraviolet and visible ray transmittance of the fullerene laminated PP film 2 was measured in the same way as in Example 8. The result is shown in FIG. 2.

Example 8 was compared with Comparative Example 7. As a result, the fullerene-laminated PP film 1 was larger in ultraviolet absorbing effect than the fullerene-laminated PP film 2.

An aggregate was present in the PP film 2, and further the number average particle diameter of particles in the dispersed phase of the hydroxylated fullerene dispersed liquid was 108.4 nm, so that the hydroxylated fullerene coat film lost denseness to be deteriorated in properties. It can be considered that this matter resulted in a deterioration of the fullerene-laminated PP film 2 in ultraviolet preventing effect.

Comparative Example 8

In the same way as in Example 8, a measurement was made about the ultraviolet and visible ray transmittance of a polypropylene resin film (hereinafter referred to as a PP film) subjected to the same surface treatment as in Example 8 and having the same thickness as used in Example 8. The result is shown in FIG. 2.

Contact Angle Property of Laminated Film

Example 9

An aqueous PVA (manufactured by Kuraray Co., Ltd.; saponification degree: 98%, and polymerization degree: 1700) solution having a concentration of 5% by weight was poured onto a glass slide to produce a PVA film of 40 μm thickness. A spin coater was used at 2000 rpm for seconds to disperse a 0.19%-by-weight hydroxylated fullerene $C_{60}(OH)_{10}$ (manufactured by Frontier Carbon Corp.) in a mixed solvent of THF and water (ratio by weight: 75:25) to produce a hydroxylated fullerene dispersed liquid. This hydroxilated fullerene dispersed liquid was applied onto the PVA film to produce a hydroxylated fullerene/PVA laminated film. This laminated film was dried at room temperature for 1 day, and then vacuum-dried for 1 day to remove the mixed solvent. The contact angle of this fullerene hydroxide/PVA laminated film with water at 25° C. was measured with a contact angle meter manufactured by Kyowa Interface Science Co., Ltd. The result is shown in Table 2.

Comparative Example 9

The same aqueous PVA (manufactured by Kuraray Co., Ltd.; saponification degree: 98%, and polymerization degree: 1700) solution as used in Example 9, which has a concentration of 5% by weight, was poured onto a glass slide to produce a PVA film of 40 μm thickness. With the same operation as in Example 9, this film was vacuum-dried for 1 day, and the contact angle of the film with water was measured at 25° C. The result is shown in Table 2.

TABLE 2

| Contact angle of laminated film with water | | |
|---|---|---|
| | Film | Contact angle of film with water (degrees) |
| Example 9 | $C_{60}(OH)_{10}$/PVA laminated film | 45.0 ± 0.9° |
| Comparative Example 9 | PVA film | 24.3 ± 1.0° |

As shown in Table 2, water resistance of the hydroxylated fullerene/PVA laminated improved more than the PVA film.

Composite Film Strength and Elongation

Example 10

Figure 3:
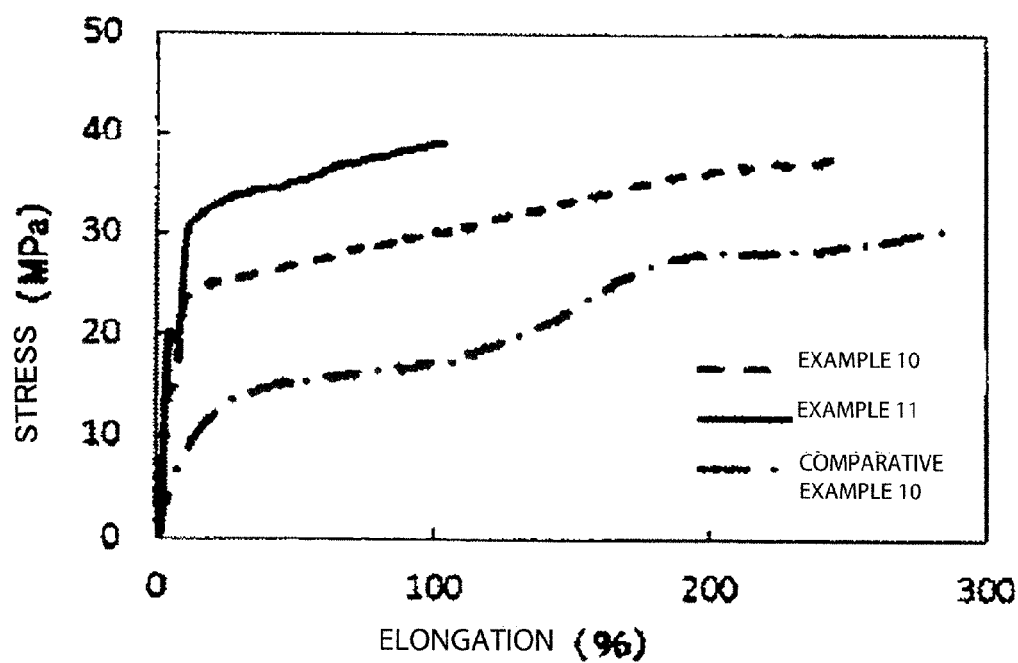
FIG. 3 is a graph showing measured results of strengths and elongation of each hydroxylated-fullerene/polyvinyl-alcohol (PVA) composite film.

A hydroxilated fullerene $C_{60}(OH)_{44}$ (manufactured by Frontier Carbon Corp.) was dispersed in a mixed solvent of THF and water (ratio by weight: 25:75) to produce a hydroxylated fullerene dispersed liquid in which the concentration of the dispersed hydroxylated fullerene was 0.5% by weight. A complex-producing solution was prepared by adding 2.04 g of the hydroxylated fullerene dispersed liquid to 10 g of an aqueous polyvinyl alcohol (PVA) (manufactured by Kuraray Co., Ltd.; saponification degree: 98%, and polymerization degree: 1700) solution (concentration: 5.0% by weight). This solution was poured onto a glass plate of 60 mm×150 mm size. The resultant was then dried at room temperature for 3 days, and then vacuum-dried for 1 day to produce a film (hydroxylated fullerene/PVA composite film). At this time, the content of the hydroxylated fullerene $C_{60}(OH)_4$, was 2% by weight of the PVA. Strengths and elongation of this composite film were measured at a tensile speed of 100 mm/min and room temperature (27° C.) by means of Autograph manufactured by Shimadzu Corp., using a load cell of 5 N. The results are shown in FIG. 3 and Table 3.

Example 11

A composite film was prepared by adding 5.10 g of the same hydroxylated fullerene dispersed liquid as used in Example 10, which has 0.5% by weight of the concentration of the hydroxylated fullerene $C_6(OH)_{44}$, to 10 g of the same aqueous 5.0%-by-weight PVA solution as used in Example 10. The content of the hydroxylated fullerene $C_{60}(OH)_{44}$ was 5% by weight of the PVA the same as Example 10. With the same operation as in Example 10, strengths and elongation of this composite film were measured. The results are shown in FIG. 3 and Table 3.

Comparative Example 10

With the same operation as in Example 10, a PVA film was prepared by using 10 g of the same aqueous 5.0%-by-weight PVA solution as used in Example 10. Film strength and elongation of this PVA film were measured. The results are shown in FIG. 3 and Table 3.

TABLE 3

Strength and elongation of hydroxylated fullerene/PVA composite films

| | $C_{60}(OH)_{44}$ proportion in composite (% by weight) | Stress at 100% elongation (MPa) | Breaking stress (MPa) | Breaking elongation (%) | Tensile elasticity (MPa × $10^{-2}$) |
|---|---|---|---|---|---|
| Example 10 | 2 | 30 | 39 | 246 | 2.16 |
| Example 11 | 5 | 38 | 39 | 103 | 2.78 |
| Comparative Example 10 | 0 (PVA) | 17 | 31 | 292 | 1.12 |

As shown in FIG. 3 and Table 3, tensile strengths (stress at an elongation percentage of 1.00% and breaking stress) and tensile elasticity of the hydroxylated fullerene/PVA composite films improved more than the PVA film. It was verified that resin compositions excellent in strength, rigidity and other dynamic properties were obtained.

Ultraviolet Preventing Effect of Composites

Example 12

Figure 4:
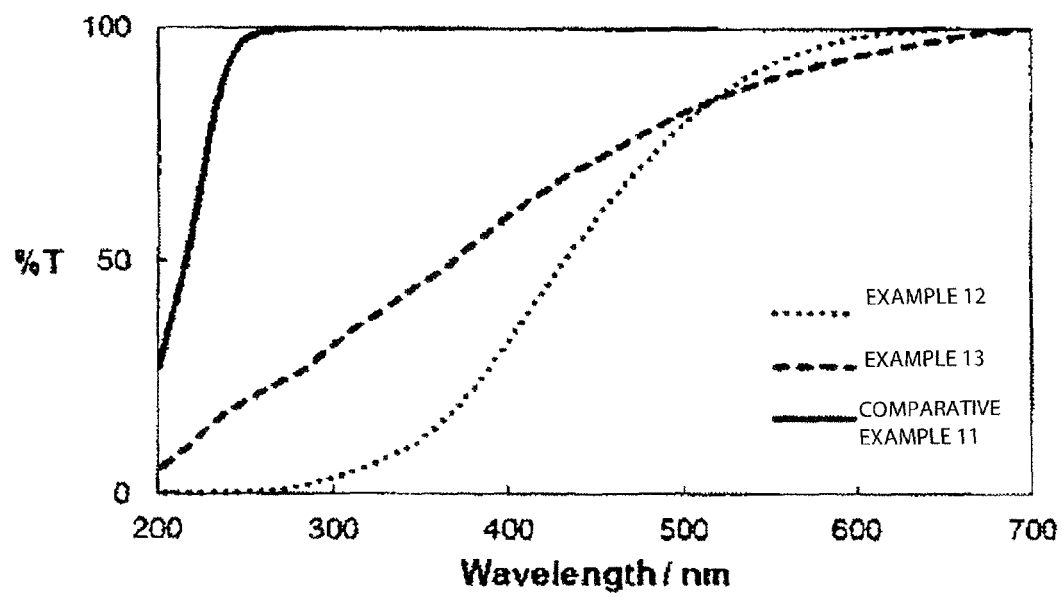
FIG. 4 is a graph showing measured results of the ultraviolet transmittance of each hydroxylated-fullerene/polyvinyl-alcohol (PVA) composite film.

A hydroxylated fullerene $C_{60}(OH)_{10}$ (manufactured by Frontier Carbon Corp.) was dispersed in a mixed solvent of THF and water (ratio by weight: 75:25) to produce a hydroxylated fullerene dispersed liquid in which the concentration of the dispersed hydroxylated fullerene was 0.5% by weight. A complex-producing solution was prepared by adding 1.02 g of the hydroxylated fullerene dispersed liquid to 10 g of an aqueous polyvinyl alcohol (PVA) (manufactured by Kuraray Co., Ltd.; saponification degree: 98%, and polymerization degree: 1700) solution (concentration: 5.0% by weight). This solution was poured onto a glass plate of 60 mm×150 mm size. The resultant was then dried at room temperature for 3 days, and then vacuum-dried for 1 day to remove THF and water. In this way, a hydroxylated fullerene/PVA composite film was produced. At this time, the content of the hydroxylated fullerene $C_{60}(OH)_{10}$ was 1% by weight of the PVA. The ultraviolet and visible ray transmittance of this composite film was measured at 25° C. and wavelengths of 200 to 700 nm under a condition that a used reference was air, using an ultraviolet spectrophotometer (V-550) manufactured by JASCO Corp. The result is shown in FIG. 4.

Example 13

In the same way as in Example 12, 10 g of the same aqueous PVA solution having the concentration of 5.0% by weight as used in Example 12 was poured onto a glass plate of 60 mm×150 mm size. The resultant was dried at room temperature for 3 days and then vacuum-dried for 1 day to produce a PVA film. A hydroxylated fullerene $C_{60}(OH)_{10}$ (manufactured by Frontier Carbon Corp.) was dispersed in a mixed solvent of THF and water (ratio by weight: 75:25) to produce a hydroxylated fullerene dispersed liquid having the concentration of 0.2% by weight. This dispersed liquid was applied, in an amount of 0.6 g, onto the PVA film to produce a hydroxylated fullerene/PVA laminated film. At this time, the thickness of the hydroxylated fullerene $C_{60}(OH)_{10}$ layer was 0.16 μm. The ultraviolet and visible ray transmittance of the film was measured by the same operation as in Example 12. The result is shown in FIG. 4.

Comparative Example 11

In the same way as in Example 12, 10 g of the same aqueous PVA solution as used in Example 12 having the concentration of 5.0% by weight was poured onto a glass plate of 60 mm×150 mm size. The resultant was dried at room temperature for 3 days and then vacuum-dried for 1 day to produce a PVA film. The ultraviolet and visible ray transmittance of this film was measured. The result is shown in FIG. 4.

As shown in FIG. 4, the hydroxylated fullerene/PVA mingled composite film and the hydroxylated fullerene/PVA laminated film were smaller in ultraviolet transmittance than the PVA film to be largely improved in ultraviolet preventing effect.

Example 14

Figure 5:
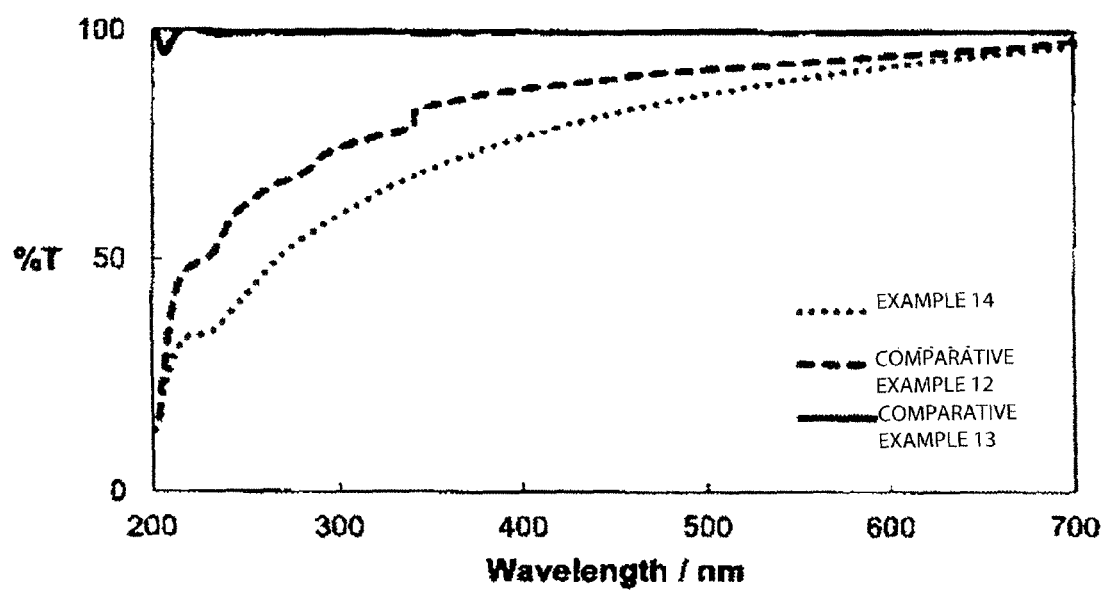
FIG. 5 is a graph showing measured results of the ultraviolet transmittance of each hydroxylated-fullerene/polypropylene composite film.

A hydroxylated fullerene $C_{60}(OH)_{10}$ (manufactured by Frontier Carbon Corp.) was dispersed in a mixed solvent of THF and water (ratio by weight: 75:25) to produce a hydroxylated fullerene dispersed liquid having the concentration of 0.5% by weight. 2.67 g of this hydroxylated fullerene dispersed liquid was pre-blended with 80 g of polypropylene, and then the resultant was melted in a laboratory mixer at the temperature of 210° C. to produce a hydroxylated-fullerene-containing resin film. The ultraviolet and visible ray transmittance of this hydroxylated-fullerene/polypropylene composite film was measured. The result is shown in FIG. 5.

Comparative Example 12

A hydroxylated fullerene $C_{60}(OH)_1$, (manufactured by Frontier Carbon Corp.) was dispersed in a mixed solvent of THF and water (ratio by weight: 25:75) to produce a hydroxylated fullerene dispersed liquid having the concentration of 0.5% by weight. 2.67 g of this hydroxylated fullerene dispersed liquid was pre-blended with 80 g of polypropylene, and then the resultant was melted in a laboratory mixer at the temperature of 210° C. to produce a hydroxylated-fullerene-containing resin film. The ultraviolet and visible ray transmittance of this film was measured. The result is shown in FIG. 5.

Comparative Example 13

80 g of the same polypropylene as used in Example 14 was melted in a laboratory mixer at the temperature of 210° C. in the same manner as in Example 14, and then a polypropylene film was produced. The ultraviolet and visible ray transmittance of this film was measured. The result is shown in FIG. 5.

As shown in FIG. 5, the hydroxylated-fullerene/polypropylene composite film of Example 14 was smaller in ultraviolet transmittance than the polypropylene film of Comparative Example 13 to be largely improved in ultraviolet preventing effect.

The hydroxylated fullerene dispersed liquid in Comparative Example 12 was identical with that in Comparative Example 2, and an aggregate was present in the disperse liquid in Comparative Examples 12, so that this film was not a dense hydroxylated-fullerene-containing resin film, which was different from the film of Example 14. Thus, the ultraviolet transmittance in Comparative Example 12 was slightly larger than that in Example 14.

Shrinkage Preventing Effects of Composites

Example 15

Under the same conditions as in Example 12, hydroxylated-fullerene/polypropylene composite films were prepared. The films of 50 mm×10 mm size were put in an atmosphere of 150° C. for 10 minutes, 20 minutes and 30 minutes, respectively. The coefficient of linear contraction of any one of the 50-mm sides of each of the films was measured. The results are shown in Table 4.

The coefficient of linear contraction is defined in accordance with the following equation:

coefficient of linear contraction (%)={("original length of the side"–"length of the side after the film shurunk")/"original length"}×100

Comparative Example 14

80 g of the same polypropylene as used in Example 15 was melted in a laboratory mixer at the temperature of 210° C. in the same manner as in Example 14, and then a polypropylene film was prepared. The coefficient of linear contraction of this film was measured under the same conditions as in Example 15. The result is shown in Table 4.

TABLE 4 coefficient of linear contraction of hydroxylated-fullerene/polypropylene composite film

| | coefficient of linear contraction (%) | | |
|---|---|---|---|
| | 150° C. × 10 minutes | 150° C. × 20 minutes | 150° C. × 30 minutes |
| Example 15 | 0.6 | 0.6 | 0.8 |
| Comparative Example 14 | 2.6 | 3.0 | 4.0 |

As shown in Table 4, the hydroxylated-fullerene/polypropylene composite film was smaller in coefficient of linear contraction than the polypropylene film to be largely improved in linear contraction preventing effect.

Although a specific form of embodiment of the present invention has been described above and illustrated in the accompanying drawings in order to be more clearly understood, the above description is made by way of example and not as a limitation to the scope of the present invention. It is contemplated that various modifications apparent to one of ordinary skill in the art could be made without departing from the scope of the invention which is to be determined by the following claims.

What is claimed is:

1. A hydroxylated-fullerene-containing solution, comprising:
    a continuous phase comprising (i) a mixed solvent consisting essentially of tetrahydrofuran and water, or (ii) melted phenol; and
    at least one compound selected from the group of a hydroxylated fullerene and a hydroxylated fullerene derivative, dispersed as a dispersed phase in the continuous phase;
    wherein the number-standard average particle diameter of particles in the dispersed phase is 50 nm or less.

2. The hydroxylated-fullerene-containing solution according to claim 1, wherein the solution comprises the mixed solvent, and contains water in a proportion of 15% by weight or more.

3. A method for producing a resin molding having a hydroxylated fullerene layer, in which at least a surface of the resin molding comprises a hydrophilic resin of a polymer having a hydrophilic group at a main chain or a side chain of the polymer, comprising:
    applying, onto the surface of the resin molding, the hydroxylated-fullerene-containing solution as recited in claim 1, the solution comprising (i) the mixed solvent; and
    removing tetrahydrofuran and water.

4. A method for producing a resin molding having a hydroxylated fullerene layer, in which at least a surface of the resin molding comprises a hydrophobic resin of a polymer being free from hydrophilic group at a main chain or a side chain of the polymer, comprising:
    subjecting the surface of the resin molding to hydrophilizing treatment;
    applying, onto the hydrophilized surface of the resin molding, the hydroxylated-fullerene-containing solution as recited in claim 1, the solution comprising (i) the mixed solvent; and
    removing tetrahydrofuran and water.

5. A method for producing a hydroxylated-fullerene-containing resin composition, comprising:
    mingling a resin with the hydroxylated-fullerene-containing solution as recited in claim 1, the solution comprising (i) the mixed solvent; and
    removing tetrahydrofuran and water.

* * * * *